(12) United States Patent
Gochenour

(10) Patent No.: US 6,578,690 B2
(45) Date of Patent: Jun. 17, 2003

(54) CLUTCH ACTUATOR

(75) Inventor: Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/845,919

(22) Filed: Apr. 30, 2001

(65) Prior Publication Data

US 2002/0157917 A1 Oct. 31, 2002

(51) Int. Cl.[7] .............................................. F16D 25/08
(52) U.S. Cl. ............................. 192/85 CA; 192/89.24; 192/91 A
(58) Field of Search ..................... 192/85 CA, 89.24, 192/91 A, 91 R, 111 A

(56) References Cited

U.S. PATENT DOCUMENTS

| 3,433,340 | A | * | 3/1969 | Murakami ................. 192/91 R |
|---|---|---|---|---|
| 3,907,085 | A | | 9/1975 | Rist ........................ 192/85 CA |
| 3,946,845 | A | | 3/1976 | Kamio |
| 4,102,446 | A | | 7/1978 | Rist ........................... 192/91 A |
| 4,328,883 | A | | 5/1982 | Shellhause ............. 192/85 CA |
| 4,633,993 | A | | 1/1987 | Limbacher et al. |
| 4,991,702 | A | | 2/1991 | Ladin ........................ 192/70.13 |
| 5,133,439 | A | | 7/1992 | Shellhause ............. 192/85 CA |
| 5,390,497 | A | | 2/1995 | Cottam ..................... 192/85 R |
| 5,577,585 | A | | 11/1996 | Corral ..................... 192/110 B |
| 5,638,934 | A | | 6/1997 | Link et al. |
| 5,823,308 | A | | 10/1998 | Ladin et al. .............. 192/13 R |
| 5,950,788 | A | | 9/1999 | Willert et al. ........... 192/85 CA |
| 6,167,997 | B1 | | 1/2001 | Keeney ....................... 192/40 |

* cited by examiner

Primary Examiner—Rodney H Bonck
Assistant Examiner—David D. Le
(74) Attorney, Agent, or Firm—Rader, Fishman & Grauer PLLC

(57) ABSTRACT

A fluid pressure operated actuator mechanism for a friction clutch is provided that includes a housing having a generally annular piston disposed therein that is operatively engaged with a resilient member that is pivotably connected to a clutch throw-out bearing. The piston is reciprocally received in a cylinder that possesses a longitudinal axis coaxial with a longitudinal axis of a clutch output shaft. The cylinder is in communication with a plurality of ducts formed in the housing that supply fluid pressure to the piston. The piston, when pressurized, causes the resilient member to pivot about a fulcrum member to redirect the force generated by the piston. The redirected force of the piston causes the bearing and a connected clutch spring to move in a direction away from the friction clutch to disengage the clutch.

21 Claims, 6 Drawing Sheets

CLUTCH ACTUATOR

FIELD OF THE INVENTION

The present invention relates generally to a fluid pressure operated actuator mechanism and more particularly to an actuator mechanism for operating a friction clutch.

BACKGROUND OF THE INVENTION

Friction clutches are commonly used in motor vehicles to transmit rotational power between an engine and a transmission. In one friction clutch design, at least one friction plate is disposed between a clutch pressure plate and an engine flywheel. A clutch housing is attached to the flywheel and includes a clutch spring that is connected to a throw-out bearing for rotation therewith. The clutch spring is typically positioned to apply a clamping force against the pressure plate. Generally, increasing the clamping force against the pressure plate "engages" the clutch, forcing the friction plate into frictional engagement with the flywheel for rotation therewith. Alternatively, decreasing the clamping force against the pressure plate "disengages" the clutch, permitting the flywheel and friction plate to rotate independent of each other. In order to "disengage" the clutch, an actuator mechanism is typically employed to pivot the clutch spring to a position that decreases the clamping force.

Concentric actuator mechanisms that engage/disengage a friction clutch are known in the art. Conventional concentric actuator mechanisms are generally characterized as either a push-type mechanism or a pull-type mechanism. While both a push-type mechanism and a pull-type mechanism typically employ a clutch spring to generate a clamping force against a pressure plate, they differ markedly in the manner in which the clamping force against the pressure plate is decreased. A push-type concentric actuator mechanism "pushes" the bearing toward the clutch causing the clutch spring to pivot away from the pressure plate. In contrast, a pull-type concentric actuator mechanism "pulls" the bearing away from the clutch causing the clutch spring to pivot away from the pressure plate. Friction clutches that employ pull-type actuators are advantageous because, unlike clutches that employ push-type actuators, the clamping force exerted by the clutch spring on the pressure plate is biased by the clutch housing, not the bearing. Therefore, a pull-type actuator mechanism is generally considered more efficient because it is possible to obtain a clamping force substantially similar to a push-type actuator with less load on the bearing. While the use of a pull-type actuator advantageously offers a more efficient clutch operation, it also has an undesirable limitation, namely, conventional pull-type concentric actuator mechanisms exhibit a relatively long axial length. Thus, such a limitation inhibits the use of a conventional pull-type actuator with a multiple-plate clutch assembly within a conventional clutch housing.

SUMMARY OF THE INVENTION

The present invention provides a pull-type concentric actuator mechanism having a relatively short axial length that permits the use of a multi-plate friction clutch assembly. In accordance with an embodiment of the invention, an actuator mechanism is provided that includes a housing having an annular shaped cylinder therein that possesses a longitudinal axis coaxial with a longitudinal axis of a clutch output shaft. A plurality of intersecting internal fluid ducts cooperate to supply fluid pressure to actuate a piston that is slidably disposed in the cylinder. The piston engages a resilient member that is pivotably secured to a bearing member for movement about a fulcrum member. A clutch spring that engages a pressure plate of the friction clutch is also pivotably secured to the bearing member opposite the resilient member. A source of fluid pressure is provided in communication with the internal fluid ducts for selectively supplying fluid pressure to the cylinder. Upon receipt of fluid pressure, the piston is extended against the biasing force of the resilient member to force the bearing member towards the housing to disengage the clutch. When fluid pressure is removed from the cylinder, the biasing force of the resilient member is operable to cause retraction of the piston into the cylinder. Furthermore, the resilient member forces movement of the bearing away from the housing permitting the clutch spring to engage the pressure plate of the friction clutch.

Among other advantages, the inventive actuator mechanism has a relatively short axial length that permits the use of a multi-plate friction clutch assembly. Moreover, when the clutch is "engaged", the force exerted by the resilient member against the bearing supplements the clamping force exerted by the clutch spring to increase the overall clamping force exerted on the pressure plate. Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
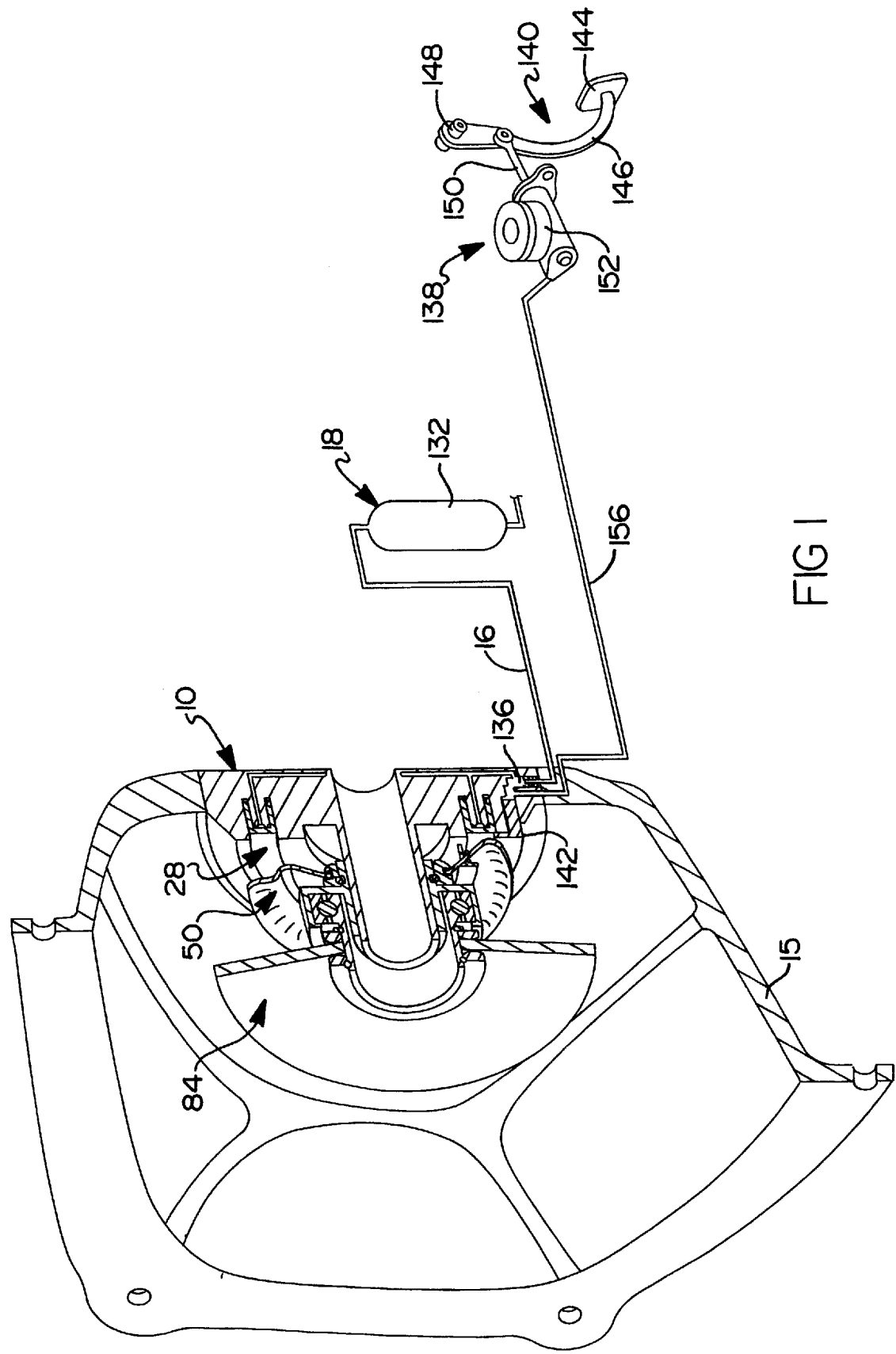
FIG. 1 is a cross-sectional perspective view of an embodiment of the present invention showing a clutch actuator mechanism.
Figure 2:
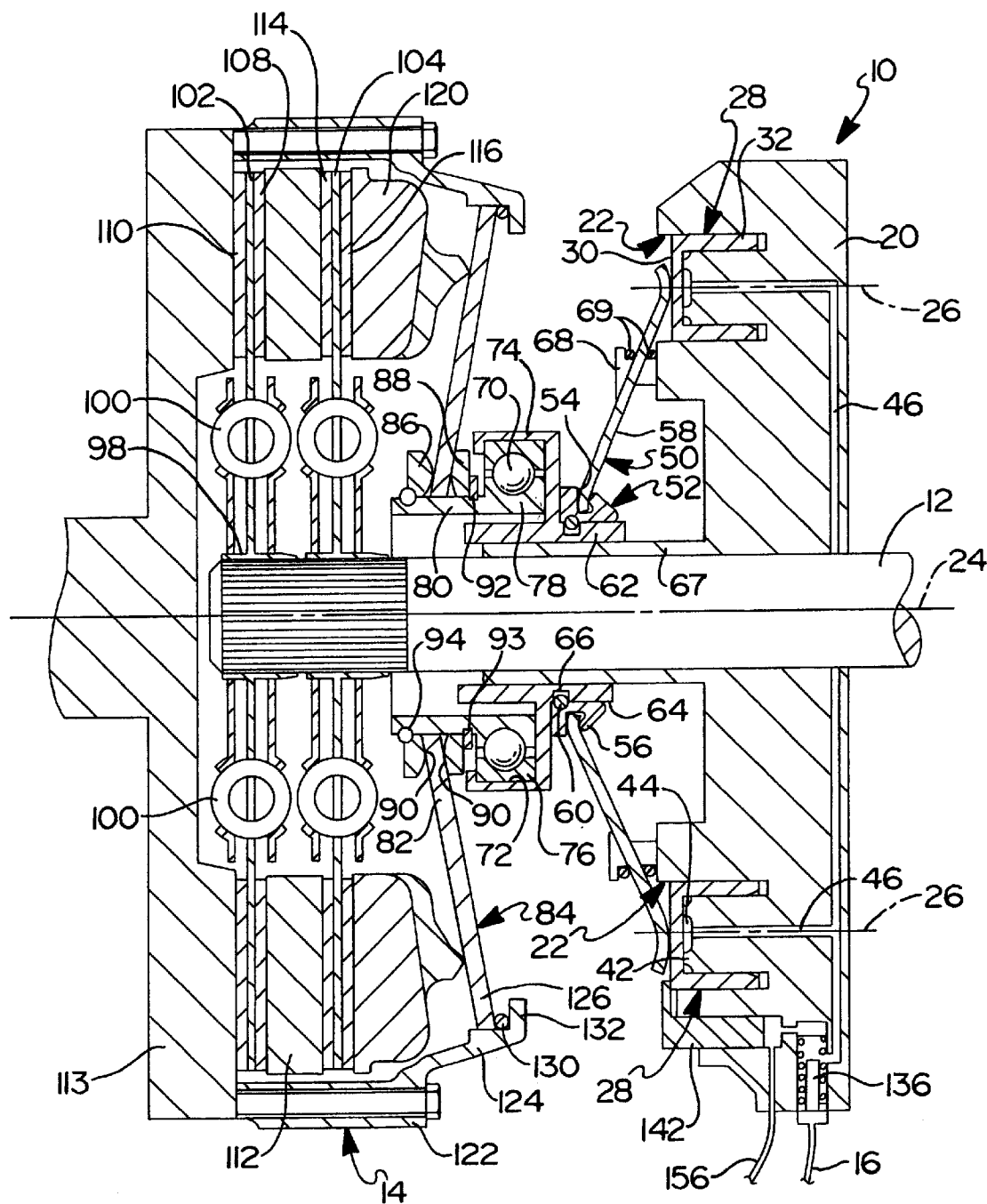
FIG. 2 is a cross-sectional view of a clutch actuator mechanism and friction clutch showing the actuator mechanism and clutch in an "engaged" position.
Figure 3:
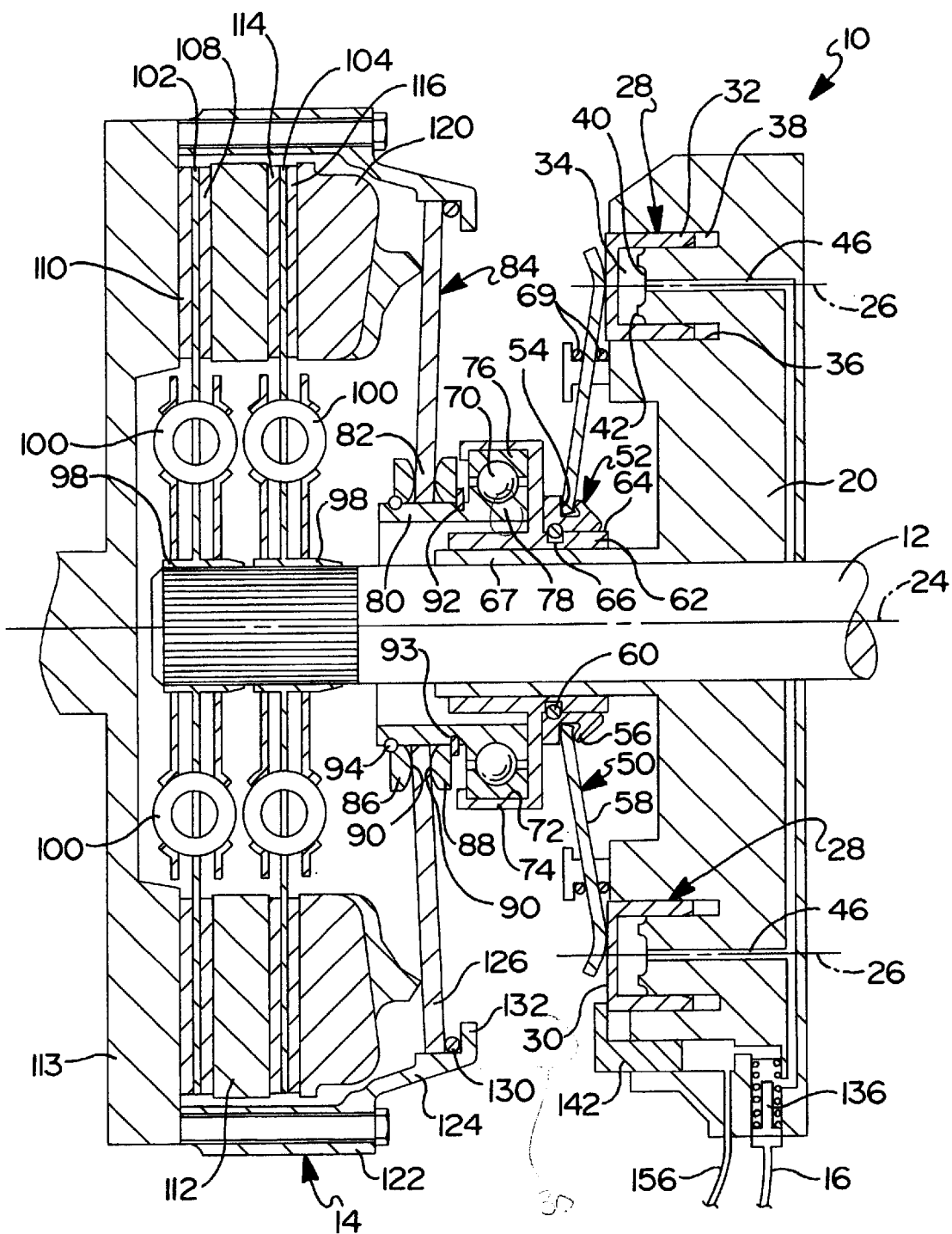
FIG. 3 is a cross-sectional view of a clutch actuator mechanism and friction clutch showing the actuator mechanism and clutch in a "disengaged" position.

Referring now to the drawings, the preferred embodiments of the present invention are described in detail. Referring to FIGS. 1, 2 and 3, a preferred embodiment of an actuator assembly 10 is shown positioned concentric a clutch output shaft 12 between a friction clutch 14 and a transmission (not illustrated). Actuator assembly 10 may be mounted to the front of the transmission or, alternatively, may be an integral part of the front "bell" housing 15 of the transmission, as illustrated in FIG. 1. Actuator assembly 10 is preferably connected to a conduit 16 that provides fluid pressure from a pressure source 18, as will be discussed in further detail below.

In a preferred embodiment, actuator assembly 10 includes an actuator housing 20 having a generally annular cylinder 22 disposed therein that is coaxially positioned about output shaft 12. A generally annular piston 28 is received in cylinder 22 and includes a head portion 30 having a skirt 32 that extends therefrom. Alternatively, actuator assembly 10 may include a plurality of individual pistons that are disposed in cylinders positioned radially outwardly of a longitudinal axis of output shaft 12, such that an axis of the individual pistons is preferably in planar alignment with the longitudinal axis of output shaft 12.

Figure 2A:
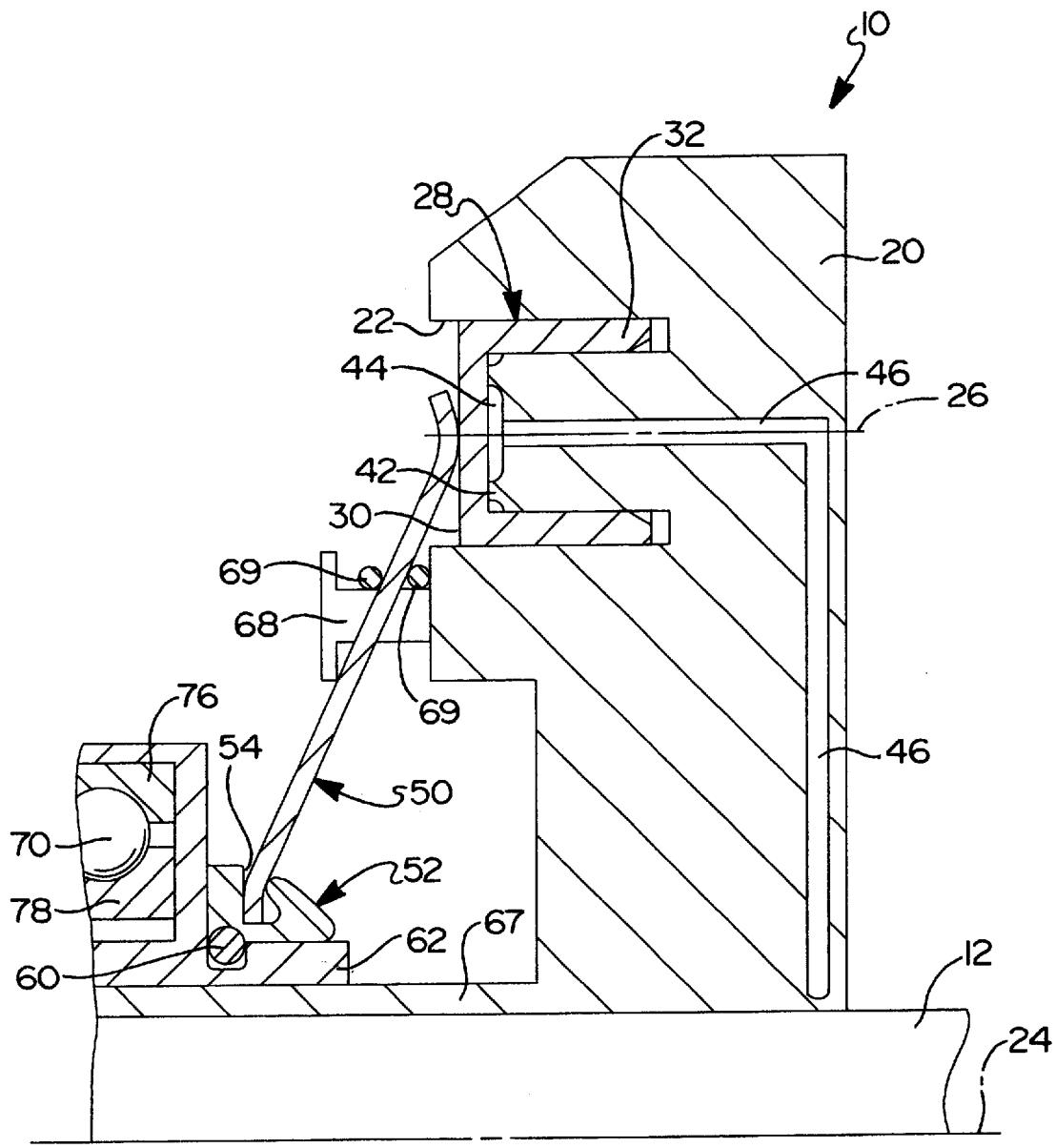
FIG. 2A is an enlarged cross-sectional view of a piston and a first resilient member as shown in FIG. 2.

As illustrated in FIGS. 2, 2A and 3, cylinder 22 generally cooperates with piston 28 to form a cylinder chamber 34 having a side wall 36 that extends into a counterbore 38 and an end wall 40 that closes one end of cylinder 22. End wall 40 preferably includes at least one raised formation 42 that forms a secondary chamber 44 between piston 28 and end wall 40 when the piston is not actuated, as shown in FIGS. 2 and 2A. Secondary chamber 44 provides a reserve of fluid to allow rapid actuation of piston 28 upon the receipt of fluid pressure. Piston 28 is reciprocally received in cylinder 22 such that piston 28 may be moved in a direction away from cylinder end wall 40 under the influence of fluid pressure in chambers 34 and 44. The stroke of piston 28 is limited by the length of skirt 32 since at least a portion of skirt 32 must remain in counterbore 38 to prevent pressure loss from chamber 34. A plurality of intersecting fluid ducts 46 are spaced apart from output shaft 12 and connect cylinder 22 with pressure source 18. The opening of ducts 46 into cylinder chamber 34 is preferably perpendicular to end wall 40. Once the fluid pressure is delivered to housing 20, there are no external passages through which the pressure must be transmitted and therefore the likelihood of leakage is considerably reduced.

Head portion 30 of piston 28 is adapted to engage a first resilient member 50, such as a diaphragm spring. First resilient member 50 is moveably secured to a flexible pivot member 52 via an annular groove 54. Groove 54 preferably includes a lip 56 that engages an inner surface 58 of first resilient member 50 to prevent first resilient member 50 from pivoting out of groove 54 during operation. Pivot member 52 preferably includes an annular bead 60 that engages a bearing housing 62 to prevent axial movement of pivot member 52 relative to housing 62 during operation of actuator assembly 10. Annular bead 60 is manufactured of a resilient material such that, during installation on bearing housing 62, it expands over an outer surface 64 and contracts into a recess 66 in bearing housing 62. Bearing housing 62 is slidably supported on a bearing retainer 67 that is preferably integral to actuator housing 20. A fulcrum member 68 is placed substantially between piston 28 and pivot member 52 and preferably includes two annular wire guides 69 that sandwich first resilient member 50. Guides 69 generally permit free radial movement but restrict axial movement of first resilient member 50 at fulcrum member 68. During operation of actuator 10, fulcrum member 68 permits the axial force of piston 28 to be redirected and applied to bearing housing 62.

In a preferred embodiment, a bearing 70, commonly referred to in the art as a throw-out bearing, is positioned within a cavity 72 formed by an arm 74 extending radially outwardly of bearing housing 62. Bearing 70 includes an outer race 76 that is received in cavity 72 and an inner race 78 that is integrally formed with a base 80 that engages a radially inner end 82 of a second resilient member 84, known in the art as a clutch spring. Inner end 82 is preferably sandwiched between two retaining members 86 and 88, each having a generally curved inner surface 90 that engages inner end 82. The curved inner surface 90 of retaining members 86, 88 permits second resilient member 84 to pivot between retaining members 86, 88. Retaining member 88 is preferably secured in position by a washer 92 that is positioned in a recess 93 and retaining member 86 is preferably secured in position by a locking member 94, such as an annular locking ring, that engages a recess 96 in base 80.

Friction clutch 14 is preferably a twin plate design with each plate having an inner hub 98 connected through a plurality of conventional spring dampers 100 with at least two friction plates 102 and 104. Although friction clutch 14 is described as a two plate design, it is recognize that friction clutch 14 may operate as a single-plate or multi-plate clutch. Inner hub 98 is preferably placed in splined engagement with output shaft 12, which also functions as the transmission input shaft. Friction plate 102 has opposed friction faces 108 and 110 that engage an intermediate friction member 112 and an engine flywheel 113, respectively. Friction plate 104 has opposed friction faces 114 and 116 that engage intermediate friction member 112 and a clutch pressure plate 120, respectively. A clutch housing 122 that is secured to flywheel 113 for rotation therewith, preferably includes an arm member 124 that extends radially inwardly to engage a radially outer end 126 of second resilient member 84. Outer end 126 is preferably moveably secured between clutch pressure plate 120 and an annular spacer 130 that is received in a shoulder 132 of arm member 124. In this configuration, second resilient member 84 rotates with the flywheel and drives inner race 78 for rotation therewith.

Referring again to FIG. 1, in a preferred embodiment, pressure source 18 is a source of compressed gas, such as air, that includes a reservoir 132 in communication with a control valve 136 that is provided between conduit 16 and ducts 46. A generally low-pressure hydraulic fluid source 138 is provided between a manually operated pedal mechanism 140 and a hydraulic sensing valve 142. Pedal mechanism 140 generally includes a foot pad 144 mounted on a pedal lever 146 that is pivoted on a pin 148 and drivingly connected to a rod 150. Rod 150 is connected to act on a master cylinder 152. The pressure generated in master cylinder 152 is delivered to sensing valve 142 via a conduit 156. As pedal mechanism 140 is depressed, master cylinder 152 produces a fluid pressure corresponding to the position of pedal mechanism 140. The hydraulic fluid from the master cylinder is transmitted through a conduit 156 to control valve 136 and sensing valve 142. Hydraulic fluid pressure at control valve 136 actuates control valve 136 to an "open" position permitting a compressed gas to enter ducts 46. Piston 28 engages and moves sensing valve 142 permitting an increase in the volume of conduit 156 to regulate the hydraulic fluid pressure at control valve 136. In this manner, it is possible to have an incremental movement in pistons 28 that is substantially proportional to an incremental depression of pedal mechanism 140.

Figure 4:
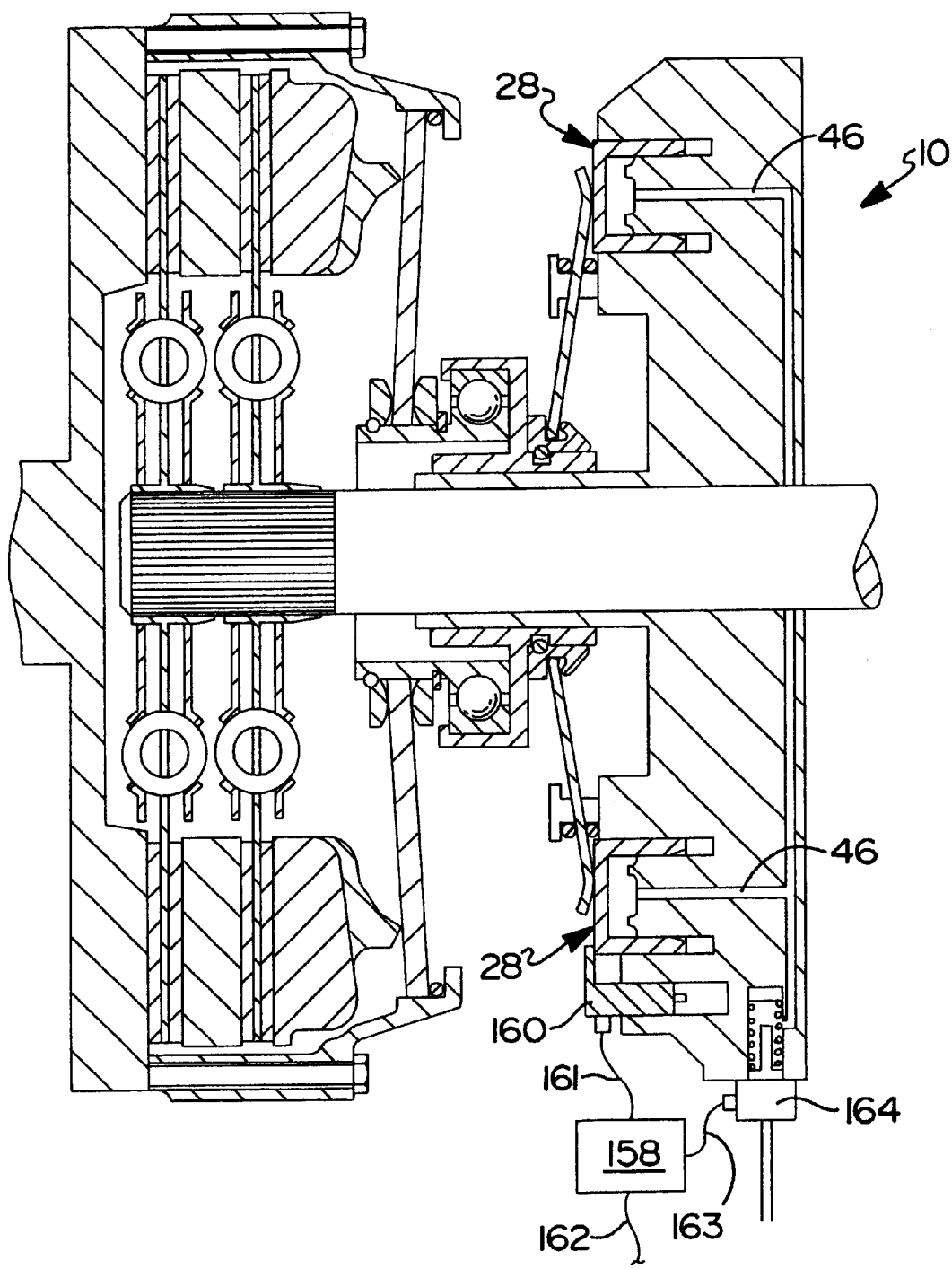
FIG. 4 is a cross-sectional view of a second embodiment of the present invention.

It is recognized, however, that other controlled sources of fluid pressure may be used with the appropriate valving and control technology to operate actuator assembly 10. For example, as illustrated in the embodiment of FIG. 4, an electronic control module 158 may be configured to receive an electronic signal corresponding to the position of pedal mechanism 140. Electronic control module 158 communicates with a variable displacement transmitter 160 that measures and supplies a signal to module 158 corresponding to the position of a piston 28. Electronic control module 158 is configured to evaluate the signals received via lines 161 and 162 that correspond to the position of pistons 28 and pedal mechanism 140, respectively. Electronic control module 158 then communicates an instruction signal via line 163 to an electronic control valve 164 that is configured to regulate the gas pressure entering ducts 46.

Figure 5:
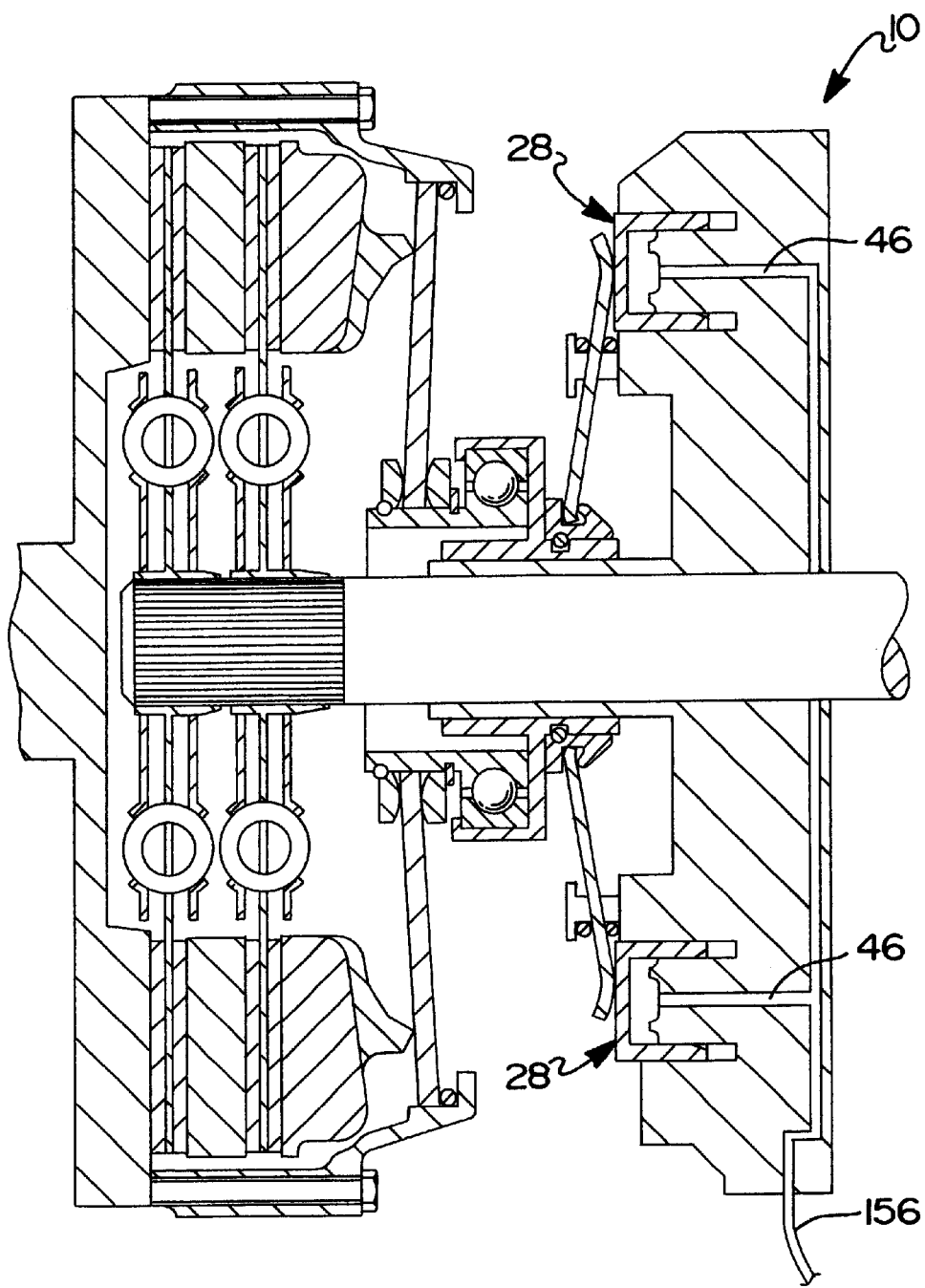
FIG. 5 is a cross-sectional view of a third embodiment of the present invention.

Alternatively, as illustrated in the embodiment of FIG. 5, pressure source 18 may comprise a master cylinder 152, as shown in FIG. 1, which is configured to supply pressurized hydraulic fluid through conduit 156 directly to ducts 46 in order to actuate pistons 28. Master cylinder 152 is preferably configured to produce a fluid pressure that corresponds to the position of the depressed pedal mechanism 140 permitting incremental movement of pistons 28.

Operation of the inventive actuator assembly 10 will now be discussed with reference to FIGS. 1, 2 and 3. Before pedal mechanism 140 is depressed, little or no fluid pressure is present in conduit 16, ducts 46, or cylinder chamber 34. As shown in FIG. 2, the biasing force of first resilient member 50 acts against piston 28 to retain piston 28 in a seated position against formation 42 in cylinder 22. Additionally, first resilient member 50 exerts a force against bearing housing 62 in a direction towards clutch 14 to supplement the clamping force second resilient member 84 exerts against pressure plate 120. In this configuration, friction plates 102 and 104 are in full frictional engagement with flywheel 113, intermediate friction member 112 and pressure plate 120 to force rotation of plates 102, 104 and connected output shaft 12 at a speed substantially proportional to the speed of flywheel 113.

Referring to FIGS. 1 and 3, when pedal mechanism 140 is depressed, fluid pressure from pressure source 18 will accumulate in conduit 16, ducts 46 and cylinder chambers 34 and 44. The fluid pressure acting against piston 28 forces piston 28 to move in a direction away from cylinder end wall 40. The movement of piston 28 forces the engaged first resilient member 50 to pivot at fulcrum member 68 forcing the attached bearing housing 62 to move in a direction away from friction clutch 14. The movement of bearing housing 62 away from friction clutch 14 substantially reduces the clamping force exerted by second resilient member 84 against pressure plate 120 permitting flywheel 113, clutch housing 122 and second resilient member 84 to rotate independently of plates 102 and 104. In this configuration, the clutch is "disengaged" and the vehicle operator is free to change gears in the transmission.

The use of first resilient member 50 in the forgoing clutch actuator assembly advantageously reduces the axial length of the actuator mechanism permitting the use of a multi-plate friction clutch. Moreover, when the clutch is "engaged", the force exerted by first resilient member 50 against bearing 70 supplements the clamping force exerted by second resilient member 84 to increase the overall clamping force exerted on pressure plate 120. Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A fluid pressure operated actuator mechanism for engaging a friction clutch having an output shaft and a clutch spring disposed coaxial with the output shaft, said actuator mechanism comprising:

a housing that includes a cylinder having a longitudinal axis coaxial with a longitudinal axis of the output shaft;

at least one fluid duct spaced apart from the output shaft and communicating with said cylinder;

a piston slidably disposed in said cylinder;

a resilient member operatively engaging said piston and pivotably connected to a bearing member that is pivotably connected to the clutch spring; and a source of fluid pressure in communication with said fluid duct for selectively supplying fluid pressure through said fluid duct to said cylinder so that said piston is extended against the biasing force of said resilient member to force said bearing member and clutch spring towards said housing to disengage said clutch, said resilient member being operable to cause retraction of said piston into said cylinder in the absence of fluid pressure and to force said bearing member and clutch spring away from said housing to engage the clutch.

2. The mechanism according to claim 1, wherein said piston includes a substantially flat head portion that engages the resilient member and a skirt that extends therefrom.

3. The mechanism according to claim 2, wherein said cylinder includes a counterbore for receiving said piston skirt.

4. The mechanism according to claim 1, wherein said cylinder includes a side wall and an end wall that cooperate with said piston to form a pressure chamber.

5. The mechanism according to claim 1, wherein said source of fluid pressure comprises a source of compressed gas.

6. The mechanism according to claim 1, wherein said source of fluid pressure comprises a source of hydraulic fluid.

7. The mechanism according to claim 1, further including a fulcrum member for redirecting the force exerted by said piston against said resilient member.

8. The mechanism according to claim 1 further including a control valve positioned between said ducts and said source of fluid pressure.

9. The mechanism according to claim 8, wherein said control valve is hydraulically actuated to a position that permits fluid from said source of fluid pressure to enter said ducts.

10. The mechanism according to claim 8, wherein said control valve is electronically actuated to a position that permits fluid from said source of fluid pressure to enter said ducts.

11. A fluid pressure operated actuator mechanism for engaging a friction clutch having an output shaft and a clutch spring disposed coaxial with the output shaft, said actuator mechanism comprising:

a housing that includes plurality of cylinders each having a piston slidably disposed therein, said cylinders having a longitudinal axis substantially parallel with and radially spaced apart from the longitudinal axis of the output shaft;

at least one fluid duct spaced apart from the output shaft and communicating with said cylinders;

a force transferring member, said force transferring member operatively engaged by said piston to cause movement of said clutch spring; and a source of fluid pressure in communication with said fluid duct for selectively supplying fluid pressure through said internal fluid duct to said cylinders so that said pistons are extended against said force transferring member to force said clutch spring away from said clutch to disengage said clutch, said force transferring member being operable to cause retraction of said pistons into said cylinders in the absence of fluid pressure and to force said clutch spring towards the clutch to engage the clutch.

12. A fluid pressure operated actuator mechanism for engaging a friction clutch having an output shaft and a clutch spring disposed coaxial with the output shaft, said actuator mechanism comprising:

a housing that includes an annular cylinder having a longitudinal axis coaxial with a longitudinal axis of the output shaft;

a plurality of intersecting internal fluid ducts spaced apart from the output shaft and communicating with said cylinder;

a piston slidably disposed in cylinders, wherein said cylinder includes a side wall and an end wall that cooperate with said piston to form a pressure chamber, said end wall of said cylinder including a formation that cooperates with said piston to form a secondary pressure chamber, said piston including a substantially flat head portion having a skirt that extends therefrom for receipt within a counterbore in said cylinder;

a resilient member operatively engaging said piston and pivotably connected to a bearing member that is pivotably connected to the clutch spring; and a source of fluid pressure in communication with said internal ducts for selectively supplying fluid pressure through said internal ducts to said cylinder so that said piston is extended against the biasing force of said resilient member to force said bearing member and clutch spring towards said housing to disengage said clutch, said resilient member being operable to cause retraction of said piston into said cylinder in the absence of fluid pressure and to force said bearing member and clutch spring away from said housing to engage the clutch.

13. The mechanism according to claim 12, wherein said source of fluid pressure comprises a source of compressed gas.

14. The mechanism according to claim 12, wherein said source of fluid pressure comprises a source of hydraulic fluid.

15. The mechanism according to claim 12 further including a control valve positioned between said ducts and said source of fluid pressure.

16. The mechanism according to claim 15, wherein said control valve is hydraulically actuated to a position that permits fluid from said source of fluid pressure to enter said ducts.

17. The mechanism according to claim 15, wherein said control valve is electronically actuated to a position that permits fluid from said source of fluid pressure to enter said ducts.

18. A fluid pressure operated actuator mechanism for engaging a friction clutch having an output shaft and a clutch spring disposed coaxial with the output shaft, said actuator mechanism comprising:

a housing that includes an annular cylinder having a longitudinal axis coaxial with a longitudinal axis of the output shaft;

a plurality of intersecting internal fluid ducts spaced apart from the output shaft and communicating with said cylinder;

a piston slidably disposed in cylinders, wherein said cylinder includes a side wall and an end wall that cooperate with said piston to form a pressure chamber, said end wall of said cylinder including a formation that cooperates with said piston to form a secondary pressure chamber, said piston including a substantially flat head portion having a skirt that extends therefrom for receipt within a counterbore in said cylinder;

a resilient member operatively engaging said piston and pivotably connected to a bearing member that is pivotably connected to the clutch spring;

a control valve positioned between said ducts and a source of compressed gas; and a pedal operated pressure source for selectively supplying fluid pressure to actuate said control valve, wherein a compressed gas is directed through said internal ducts to said cylinders so that said piston is extended against the biasing force of said resilient member to force said bearing member and clutch spring towards said housing to disengage said clutch, said resilient member being operable to cause retraction of said piston into said cylinder and to force said bearing member and clutch spring away from said housing to engage the clutch in the absence of compressed gas.

19. A fluid pressure operated actuator mechanism for engaging a friction clutch having an output shaft and a clutch spring disposed coaxial with the output shaft, said actuator mechanism comprising:

a housing that includes at least one piston slidably disposed in a cylinder having a longitudinal axis parallel with a longitudinal axis of the output shaft;

at least one fluid duct spaced apart from the output shaft and communicating with said cylinder;

a force transferring member, said force transferring member operatively engaged by said piston to cause movement of said clutch spring; and a source of fluid pressure in communication with said fluid duct for selectively supplying fluid pressure through said fluid duct to said cylinder so that said piston is extended against said force transferring member to force said clutch spring away from said clutch to disengage said clutch, said force transferring member being operable to cause retraction of said piston into said cylinder in the absence of fluid pressure and to force said clutch spring towards the clutch to engage the clutch.

20. A fluid pressure operated actuator mechanism for engaging a friction clutch having an output shaft and a clutch spring disposed coaxial with the output shaft, said actuator mechanism comprising:

a housing that includes a cylinder having a longitudinal axis coaxial with a longitudinal axis of the output shaft;

at least one fluid duct spaced apart from the output shaft and communicating with said cylinder;

a piston slidably disposed in said cylinder, said cylinder including a side wall and an end wall that cooperate with said piston to form a pressure chamber, said end wall of said cylinder including a formation that cooperates with said piston to form a secondary pressure chamber;

a resilient member operatively engaging said piston and pivotably connected to a bearing member that is pivotably connected to the clutch spring; and a source of fluid pressure in communication with said fluid duct for selectively supplying fluid pressure through said fluid duct to said cylinder so that said piston is extended against the biasing force of said resilient member to force said bearing member and clutch spring towards said housing to disengage said clutch, said resilient member being operable to cause retraction of said piston into said cylinder in the absence of fluid pressure and to force said bearing member and clutch spring away from said housing to engage the clutch.

21. A sub-assembly for use in a fluid pressure operated actuator mechanism, said sub-assembly operable to redirect a force exerted by a fluid pressure actuated piston, said sub-assembly comprising:

a bearing member;

a resilient member operatively engaging the piston, said resilient member pivotably connected to said bearing member; and a fulcrum member positioned between a first end of said resilient member that engages the piston, and a second end of said resilient member that engages said bearing member, whereby the piston is operable to selectively overcome the resilient biasing of said resilient member to force said resilient member to pivot about said fulcrum member to produce movement of said bearing member in a direction opposite the movement of the piston.

* * * * *